US 9,229,900 B2

(12) United States Patent
Blue et al.

(10) Patent No.: US 9,229,900 B2
(45) Date of Patent: Jan. 5, 2016

(54) TECHNIQUES FOR ASCRIBING SOCIAL ATTRIBUTES TO CONTENT

(71) Applicant: LinkedIn Corporation, Mountain View, CA (US)

(72) Inventors: Allen Blue, Sunnyvale, CA (US); Ryan Roslansky, Hillsborough, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/085,402

(22) Filed: Nov. 20, 2013

(65) Prior Publication Data
US 2014/0143228 A1 May 22, 2014

Related U.S. Application Data

(63) Continuation-in-part of application No. 13/303,812, filed on Nov. 23, 2011, and a continuation-in-part of application No. 13/010,681, filed on Jan. 20, 2011.

(51) Int. Cl.
*G06F 17/30* (2006.01)
*G06F 15/173* (2006.01)
*G06Q 30/02* (2012.01)
*G06Q 50/00* (2012.01)

(52) U.S. Cl.
CPC .... *G06F 15/17306* (2013.01); *G06F 17/30867* (2013.01); *G06F 17/30011* (2013.01); *G06Q 30/0241* (2013.01); *G06Q 50/01* (2013.01)

(58) Field of Classification Search
CPC .................. G06F 17/30867; G06F 17/30011; G06Q 50/01; G06Q 30/0241
USPC ........................................................ 707/727
See application file for complete search history.

(56) References Cited

U.S. PATENT DOCUMENTS

| 6,981,040 | B1 | 12/2005 | Konig et al. |
| 7,984,056 | B1 | 7/2011 | Kane |
| 8,060,405 | B1 * | 11/2011 | Lawrence ..................... 707/706 |
| 8,090,794 | B1 | 1/2012 | Kilat et al. |
| 8,306,922 | B1 * | 11/2012 | Kunal et al. ................... 705/319 |
| 2006/0200434 | A1 | 9/2006 | Flinn et al. |

(Continued)

OTHER PUBLICATIONS

"U.S. Appl. No. 13/010,681, Final Office Action mailed Mar. 14, 2014", 17 pgs.

(Continued)

*Primary Examiner* — Rehana Perveen
*Assistant Examiner* — Tiffany Thuy Bui
(74) *Attorney, Agent, or Firm* — Schwegman Lundberg & Woessner, P.A.

(57) ABSTRACT

Techniques for ascribing social attributes to content items and for selecting content to display in a content feed are described. According to various embodiments, accessing one or more content items accessible via a network are accessed, each of the content items having received one or more social activity signals. Thereafter, members of an online social network service that submitted the social activity signals may be identified. Member profile data identifying member profile attributes of the members cemented the social activity signals may then be accessed. Thereafter, social attribute information may be generated and associated with each of the content items, the social attribute information identifying the member profile attributes of the members that submitted the social activity signals associated with each of the content items.

13 Claims, 11 Drawing Sheets

(56) References Cited

U.S. PATENT DOCUMENTS

| | | | |
|---|---|---|---|
| 2007/0118802 A1 | 5/2007 | Gerace et al. | |
| 2009/0086720 A1* | 4/2009 | Westlake | 370/352 |
| 2009/0234876 A1 | 9/2009 | Schigel et al. | |
| 2009/0327232 A1* | 12/2009 | Carter et al. | 707/3 |
| 2010/0205541 A1 | 8/2010 | Rapaport et al. | |
| 2010/0262658 A1 | 10/2010 | Mesnage | |
| 2010/0312644 A1 | 12/2010 | Borgs et al. | |
| 2011/0066615 A1* | 3/2011 | Pradhan et al. | 707/737 |
| 2011/0191311 A1* | 8/2011 | Polonsky et al. | 707/706 |
| 2012/0079023 A1* | 3/2012 | Tejada-Gamero et al. | 709/204 |
| 2012/0110096 A1* | 5/2012 | Smarr et al. | 709/206 |
| 2012/0166530 A1* | 6/2012 | Tseng | 709/204 |
| 2012/0191776 A1 | 7/2012 | Ruffner et al. | |
| 2012/0197881 A1 | 8/2012 | Blue et al. | |
| 2013/0066711 A1* | 3/2013 | Liyanage et al. | 709/204 |
| 2013/0227020 A1 | 8/2013 | Ruffner et al. | |
| 2013/0263020 A1* | 10/2013 | Heiferman et al. | 715/753 |
| 2013/0304731 A1* | 11/2013 | Zheng et al. | 707/728 |
| 2014/0019882 A1* | 1/2014 | Chew et al. | 715/753 |
| 2015/0149453 A1 | 5/2015 | Blue et al. | |

OTHER PUBLICATIONS

"U.S. Appl. No. 13/010,681, Non Final Office Action mailed Jul. 31, 2013", 16 pgs.

"U.S. Appl. No. 13/010,681, Response mailed Dec. 31, 2013 to Non Final Office Action filed Jul. 31, 2013", 11 pgs.

"U.S. Appl. No. 13/303,812, Non Final Office Action mailed Feb. 14, 2014", 24 pgs.

"U.S. Appl. No. 13/010,681, Non Final Office Action mailed Oct. 23, 2014", 20 pgs.

"U.S. Appl. No. 13/010,681. Response filed Aug. 14, 2014 to Office Action mailed Mar. 14, 2014.", 11 pgs.

"U.S. Appl. No. 13/303,812, Advisory Action mailed Sep. 24, 2014", 3 pgs.

"U.S. Appl. No. 13/303,812, Final Office Action mailed Jun. 19, 2014", 26 pgs.

"U.S. Appl. No. 13/303,812, Response filed Jun. 10, 2014 to Non Final Office Action mailed Feb. 14, 2014", 13 pgs.

"U.S. Appl. No. 13/303,812, Response filed Aug. 19, 2014 to Final Office Action mailed Jun. 19, 2014", 11 pgs.

"U.S. Appl. No. 13/853,020, Non Final Office Action mailed Oct. 24, 2014", 12 pgs.

"U.S. Appl. No. 13/010,681, Examiner Interview Summary mailed Feb. 12, 2015", 3 pgs.

"U.S. Appl. No. 13/010,681, Response filed Feb. 23, 2015 to Non-Final Office Action mailed Oct. 23, 2014", 11 pgs.

"U.S. Appl. No. 13/303,812, Appeal Brief filed Jan. 9, 2015", 18 pgs.

"U.S. Appl. No. 13/303,812, Decision on Pre-Appeal Brief Request mailed Dec. 9, 2014", 2 pgs.

"U.S. Appl. No. 13/303,812, Pre-Appeal Brief Request filed Oct. 24, 2014", 6 pgs.

"U.S. Appl. No. 13/853,020, Response filed Jan. 26, 2015 to Non Final Office Action mailed Oct. 24, 2014", 13 pgs.

"U.S. Appl. No. 13/010,681, Notice of Allowance mailed Jun. 17, 2015", 7 pgs.

"U.S. Appl. No. 13/853,020, Final Office Action mailed May 20, 2015", 13 pgs.

"U.S. Appl. No. 14/592,810, Non Final Office Action mailed Apr. 2, 2015", 44 pgs.

"U.S. Appl. No. 14/592,810, Response filed Jul. 2, 2015 to Non Final Office Action maield Apr. 2, 2015", 11 pgs.

* cited by examiner

*The New York Globe*

The Commercial And Critical Success Behind ACME Corp

| 401 | 402 | 403 | 404 |
| --- | --- | --- | --- |
| Views 31,769 | Likes 319 | Shares 132 | Comments 59 |

Add your comment...

John Smith
How interesting!
Like   Reply   1 hour ago

Jane Doe
Nice post
Like   Reply   2 hours ago

George Oscar
To the author of this article: do you realize that...
Like   Reply   3 hours ago Show More Comments

Share an update...

901

ACME Corp  This article is trending among Computer Scientists!

The New York Globe: The commercial and critical success behind ACME Corp....

Follow ACME Corp  Like  Comment  Share  Now

Ryan Roslansky has an updated profile
  Skills: Product Management, Online Advertising

Edison Motors
The new T-class sets a new standard for excellent in is segment. Thoroughly reimagined....

Like  Comment  Share  3h ago

Allen Blue

A Short Story About Leadership
storypost.com

Like  Comment  Share  4h ago

Erran Berger's skills and experience were endorsed by John Smith
Baoshi was endorsed for Machine Learning

Rich Industries
Companies that invest more than 25% of their marketing budget on optimization are twice as likely to see higher conversion rates....

Like  Comment  Share  4h ago

Andrew Hill is now following
  LINKEDIN

*Fig. 9*

TECHNIQUES FOR ASCRIBING SOCIAL ATTRIBUTES TO CONTENT

RELATED APPLICATIONS

This application is a continuation-in-part claiming the benefit of priority to U.S. patent application Ser. No. 13/010,681, filed Jan. 20, 2011, and to U.S. patent application Ser. No. 13/303,812, filed Nov. 23, 2011, which applications are herein incorporated by reference in their entirety.

TECHNICAL FIELD

The present application relates generally to data processing systems and, in one specific example, to techniques for ascribing social attributes to content items and for selecting content to display in a content feed.

BACKGROUND

Many social network services such as LinkedIn® and Facebook® include "feeds" or "streams" that display various content in reverse chronological order, with newer or more recent content appearing higher in the feed. Such feeds or streams are also commonly referred to as news feeds, activity feeds, network update feeds, status feeds, data feeds, news streams, activity streams, network update streams, status streams, data streams, and so on.

BRIEF DESCRIPTION OF THE DRAWINGS

Some embodiments are illustrated by way of example and not limitation in the figures of the accompanying drawings in which:

FIG. 4 illustrates an example of a content item, according to various embodiments;

FIG. 9 illustrates an example of a content feed of a social network service, according to various embodiments;

DETAILED DESCRIPTION

Example methods and systems for ascribing social attributes to content items and for selecting content to display in a content feed are described. In the following description, for purposes of explanation, numerous specific details are set forth in order to provide a thorough understanding of example embodiments. It will be evident, however, to one skilled in the art that the present invention may be practiced without these specific details.

According to various embodiments, a system is configured to acquire various content accessible via a network, such as the Internet (e.g., webpages, news items, articles, publications, blog posts, advertisements, etc.), and to ascribe various social attributes to that content that describe the types of users that have interacted with the content in various ways. For example, the system may ascribe social attributes to an article indicating that, for example, the article is trending among people that went to school at the University of Michigan, or people that work at LinkedIn®, or people that have the skills of "C++" and "Java" on LinkedIn®, or people that have been endorsed for the skill of "Product Development" on LinkedIn®, and so on.

Thereafter, when a user logs into a website and views a content feed of the website (e.g., a content feed associated with an online social network service such as LinkedIn® or Facebook®), the system may analyze various member profile attributes of this logged-in user, and the system may identify content items that are associated with the social attributes matching the member profile attributes of the visiting member. The system may then display these content items in the content feed. For example, if the logged-in user is a lawyer that went to the University of Michigan, that lives in the Bay Area, and that has been endorsed for the skills of "criminal law" and "trial law", then the system may identify content items that have been disseminated by (or are trending among) users with similar social attributes, and the system may display such content to the logged-in user.

Accordingly, the system described herein is configured to ascribe rich, deep, and highly detailed social attributes to each piece of content acquired from the Internet, in order to ultimately provide highly customized content feeds to viewers based on content trending among users associated with attributes (e.g., job titles, job experience, employer, employer size, seniority level, education credentials, alumni, skills, endorsements, location, and so on) that match attributes of the viewer of the content feed. Accordingly, viewers of a content feed are provided with content that is highly personalized and relevant to the viewer.

Figure 1:
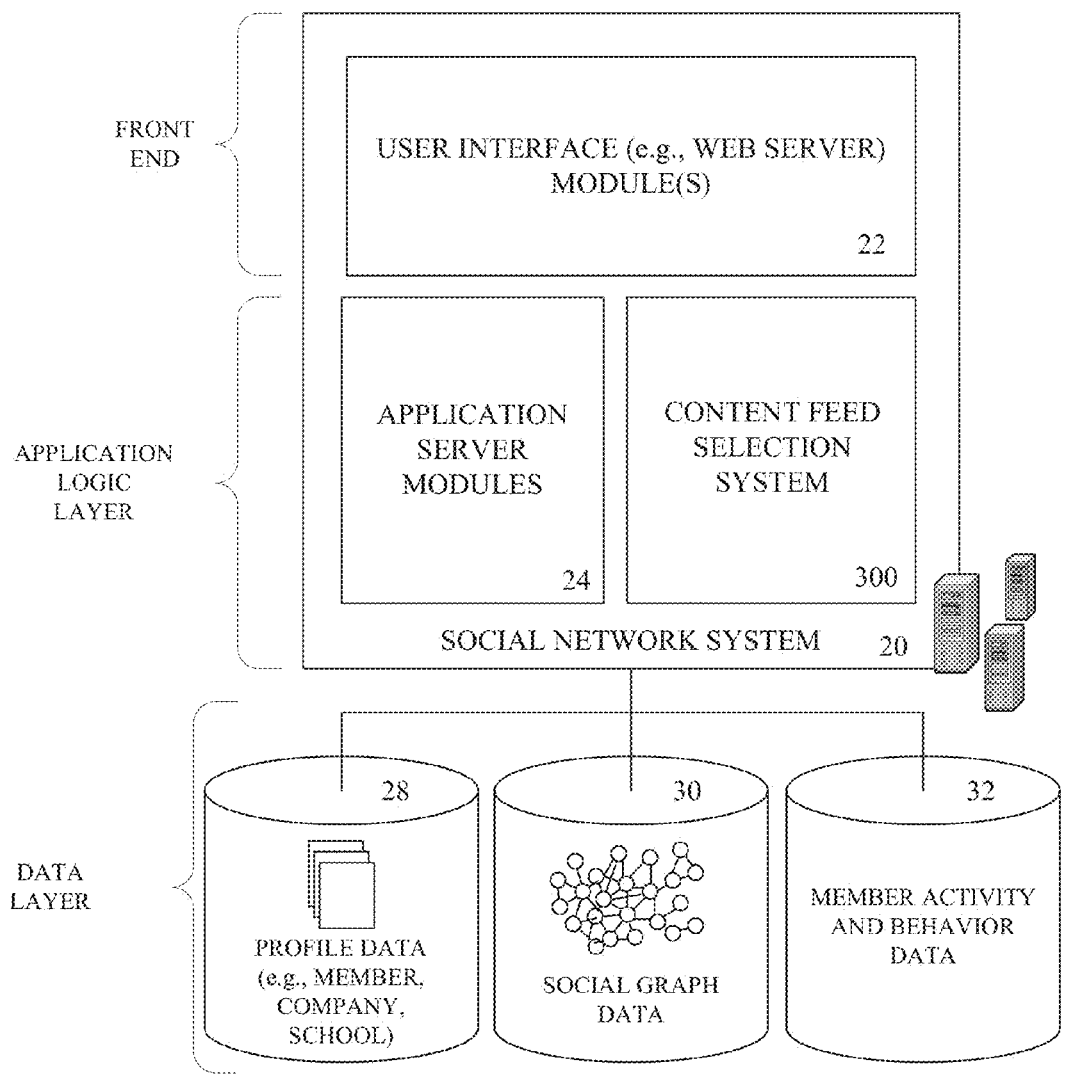
FIG. 1 is a block diagram showing the functional components of a social networking service, consistent with some embodiments of the invention.

FIG. 1 is a block diagram illustrating various components or functional modules of a social network service such as the social network system 20, consistent with some embodiments. As shown in FIG. 1, the front end consists of a user interface module (e.g., a web server) 22, which receives requests from various client-computing devices, and communicates appropriate responses to the requesting client devices. For example, the user interface module(s) 22 may receive requests in the form of Hypertext Transport Protocol (HTTP) requests, or other web-based, application programming interface (API) requests. The application logic layer includes various application server modules 14, which, in conjunction with the user interface module(s) 22, generates various user interfaces (e.g., web pages) with data retrieved from various data sources in the data layer. With some embodiments, individual application server modules 24 are used to implement the functionality associated with various services and features of the social network service. For instance, the ability of an organization to establish a presence in the social graph of the social network service, including the ability to establish a customized web page on behalf of an organization, and to publish messages or status updates on behalf of an organization, may be services implemented in independent application server modules 24. Similarly, a variety of other applications or services that are made available to members of the social network service will be embodied in their own application server modules 24.

As shown in FIG. 1, the data layer includes several databases, such as a database 28 for storing profile data, including both member profile data as well as profile data for various organizations. Consistent with some embodiments, when a person initially registers to become a member of the social network service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 28. Similarly, when a representative of an organization initially registers the organization with the social network service, the representative may be prompted to provide certain information about the organization. This information may be stored, for example, in the database with reference number 28, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph, shown in FIG. 1 with reference number 30.

The social network service may provide a broad range of other applications and services that allow members the opportunity to share and receive information, often customized to the interests of the member. For example, with some embodiments, the social network service may include a photo sharing application that allows members to upload and share photos with other members. With some embodiments, members may be able to self-organize into groups, or interest groups, organized around a subject matter or topic of interest. With some embodiments, the social network service may host various job listings providing details of job openings with various organizations.

As members interact with the various applications, services and content made available via the social network service, the members' behavior (e.g., content viewed, links or member-interest buttons selected, etc.) may be monitored and information concerning the member's activities and behavior may be stored, for example, as indicated in FIG. 1 by the database with reference number 32. This information may be used to classify the member as being in various categories. For example, if the member performs frequent searches of job listings, thereby exhibiting behavior indicating that the member is a likely job seeker, this information can be used to classify the member as a job seeker. This classification can then be used as a member profile attribute for purposes of enabling others to target the member for receiving messages or status updates. Accordingly, a company that has available job openings can publish a message that is specifically directed to certain members of the social network service who are job seekers, and thus, more likely to be receptive to recruiting efforts.

With some embodiments, the social network system 20 includes what is generally referred to herein as a content selection system 200. The content feed selection system 200 is described in more detail below in conjunction with FIG. 2.

Although not shown, with some embodiments, the social network system 20 provides an application programming interface (API) module via which third-party applications can access various services and data provided by the social network service. For example, using an API, a third-party application may provide a user interface and logic that enables an authorized representative of an organization to publish messages from a third-party application to a content hosting platform of the social network service that enables facilitates presentation of activity or content streams maintained and presented by the social network service. Such third-party applications may be browser-based applications, or may be operating system-specific. In particular, some third-party applications may reside and execute on one or more mobile devices (e.g., phone, or tablet computing devices) having a mobile operating system.

According to various exemplary embodiments described in more detail below, a content feed selection system 200 is configured to scan or crawl a network such as the Internet in order to acquire various content accessible via the network (e.g., webpages, news items, articles, publications, blog posts, advertisements, etc.), and to ascribe various social attributes to that content describing users that have interacted with the content in various ways. For example, in some embodiments, the content feed selection system 200 may ascribe social attributes to content on the webpages based on profile attributes of the users that are submitting social activity signals (e.g., likes, views, comments, shares, follows, clicks, etc.) in connection with the content.

Figure 2:
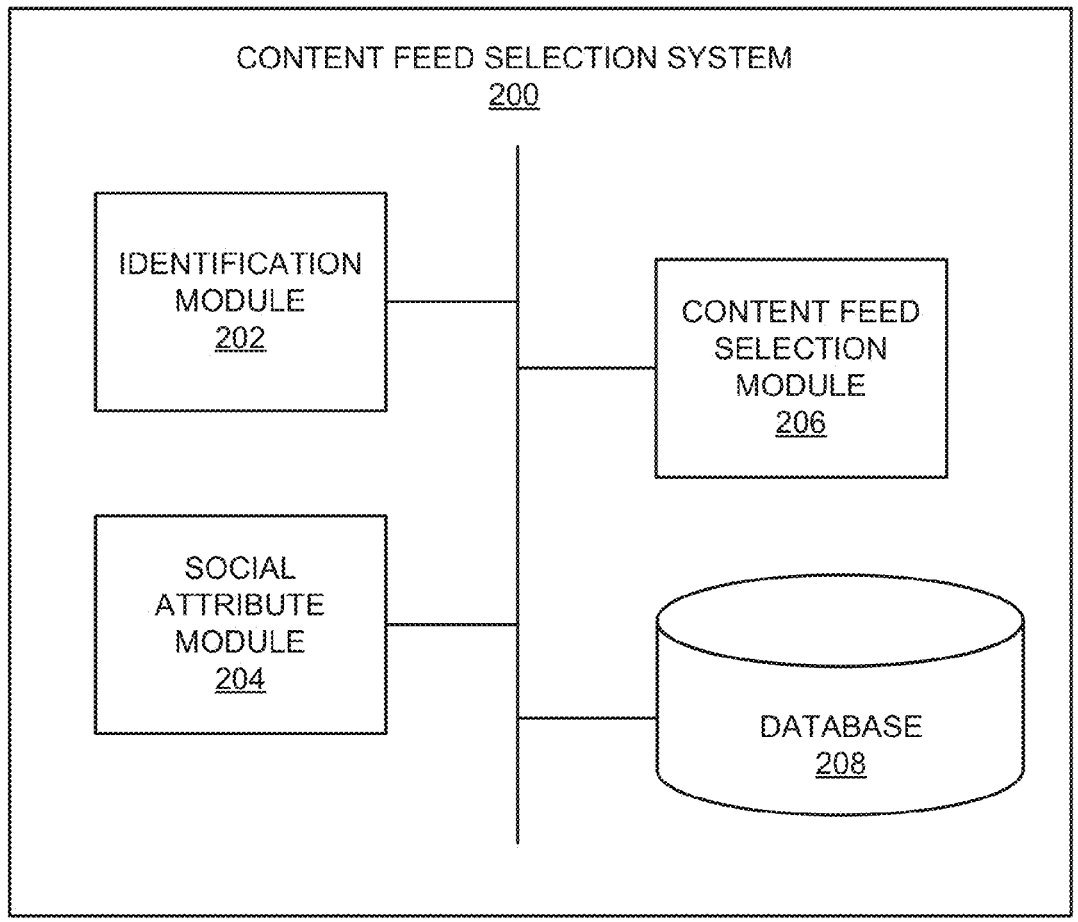
FIG. 2 is a block diagram of an example system, according to various embodiments.

For example, with reference to FIG. 2, the content selection system 200 includes an identification module 202, a social attribute module 204, a content feed selection module 206, and a database 208. The modules of the content feed selection system 200 may be implemented on or executed by a single device such as a content selection device, or on separate devices interconnected via a network. The aforementioned content selection device may be, for example, one of the client machines (e.g. 110, 112) or application server(s) 118 illustrated in FIG. 1.

Figure 3:
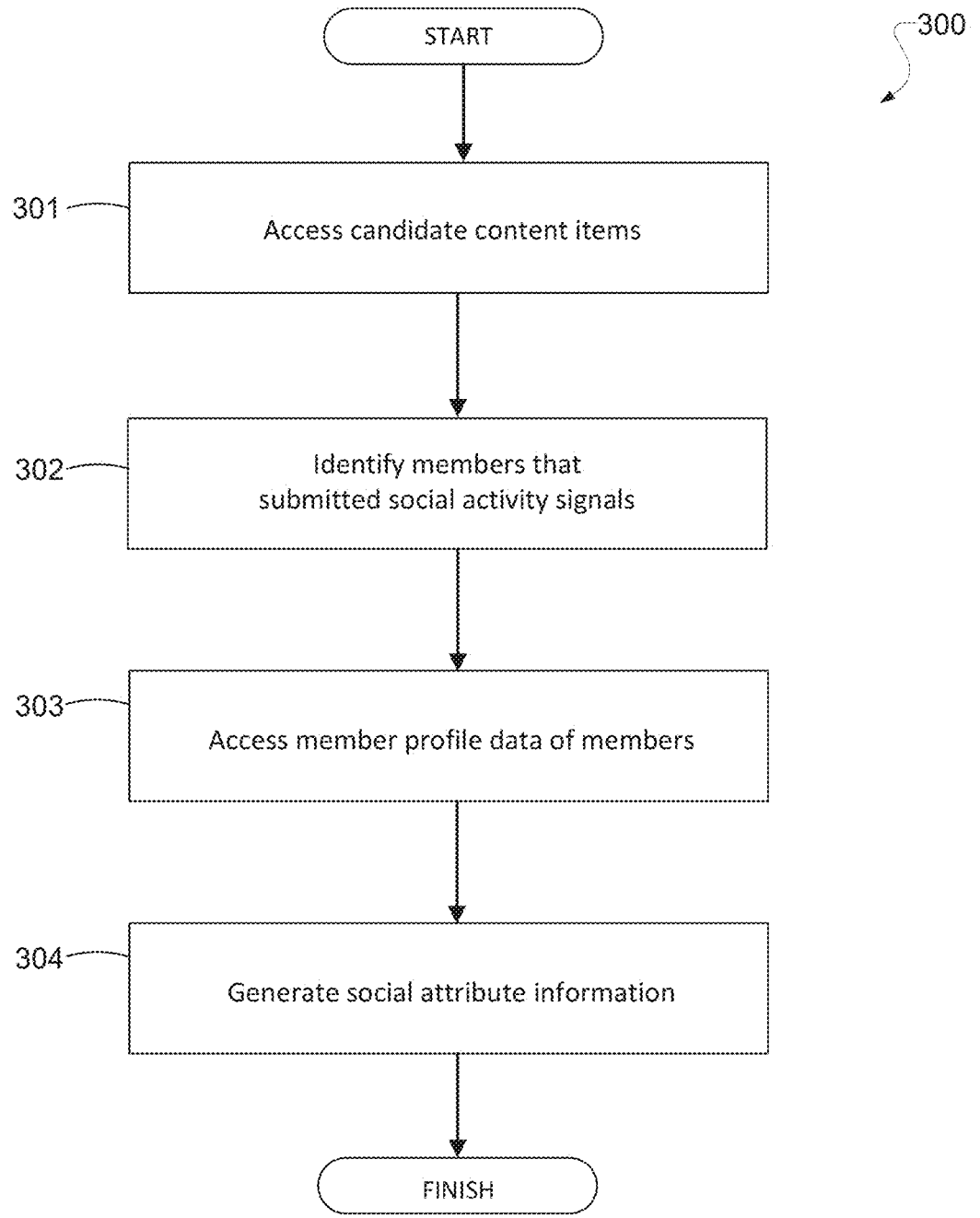
FIG. 3 is a flowchart illustrating an example method, according to various embodiments.

FIG. 3 is a flowchart illustrating an example method 300, according to various exemplary embodiments. The method 300 may be performed at least in part by, for example, the content feed selection system 200 illustrated in FIG. 2 (or an apparatus having similar modules, such as client machines 110 and 112 or application server 118 illustrated in FIG. 1). The operations 301-304 will now be briefly described. In operation 301, the identification module 202 accesses one or more content items accessible via a network, with each of the content items having received one or more social activity signals. In some embodiments, the content item may be a news item, a publication, an article, a blog post, an advertisement, a webpage, and so on. In operation 302 in FIG. 3, the identification module 202 identifies members of an online social network service (e.g., LinkedIn®, Facebook®, Twitter®, etc.) that submitted the social activity signals in connection with the accessed content item. In operation 303 in FIG. 3, the social attribute model 204 accesses member profile data identifying member profile attributes of the members that submitted the social activity signals in connection with the accessed content item. In some embodiments, the member profile attributes may include a professional experience position of the member, an education position of the member, a skill of the member, a location of the member, a gender of the member, and an age of the member. In operation 304 in FIG. 3, the social attribute model 204 generates social attribute information associated with the content item. The social attribute information identifies the member profile attributes of one or more of the members that submitted the social activity signals associated with the content item (see FIG. 7). Accordingly, various social attributes of members that have interacted with the content item in a significant way are ascribed to that content item. In some embodiments, the content feed selection system 200 may store the social attribute information associated with each of the content items in association with each of the content items in a database (see FIG. 7).

The content items referred to herein may be any type of content item, including online content items displayed in, or accessible by, a webpage or a user interface of a mobile application. Non-limiting examples of content items include webpages, news items, blog posts, articles, publications, presentations, slideshows, documents, reviews, pictures, videos, multimedia, webpages, rich media, text, video, advertisements, coupons, promotions, brochures, items posted in a content stream or content feed, notifications, emails, text or instant messages, message boards, bulletin boards, forums, profile pages (e.g., profile pages on a social network service such as LinkedIn®, such as member profile pages, influencer profile pages, company profile pages, group profile pages, etc.), and so on. In some embodiments, the social activity signals may include views, likes, comments, shares, follows, clicks, conversions, hover responses, hide responses, views of comments, likes of comments, shares of comments, etc.

In some embodiments, after the identification module 202 acquires a piece of content such as an article posted on a webpage (operation 301 in FIG. 3), the identification module 202 may identify some or all of the users that have interacted with the content (operation 302 in FIG. 3) by, for example, crawling or searching for social activity history information associated with the webpage. As described herein, social activity history information may include any data or metadata describing social activity signals associated with content items. In some embodiments, such social activity history information may be displayed on the crawled webpage itself (e.g., the portions of the webpage that includes information summarizing the number of views, likes, shares, comments, etc., that the content has received, as well as displaying the actual comments and the identity of users that are posting comments). In some embodiments, if the content item is posted on a social network service (e.g., posted on the LinkedIn Today section of the LinkedIn® homepage), the social network service may maintain social activity history information indicating how many views, likes, shares, comments, etc., each content item has received, including social activity history information describing the substance of the comments associated with each of the content items. Such social activity history information may be stored locally at, for example, the database 208 illustrated in FIG. 2, or may be stored remotely at a database, data repository, storage server, etc., that is accessible by the content promotion system 200 via a network (e.g., the Internet).

Figure 5:
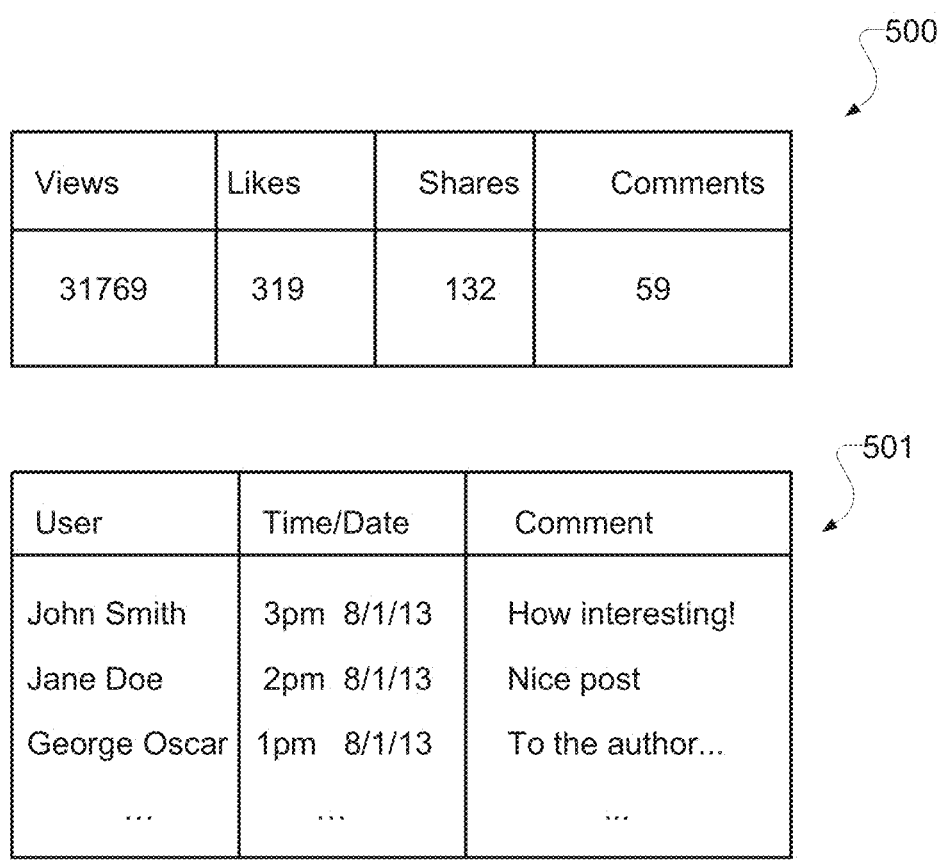
FIG. 5 illustrates an example of social activity history information associated with the content item, according to various embodiments.

For example, FIG. 4 illustrates an example of the content item corresponding to an article 400 describing the ACME corporation, where the article 400 includes various social activity signals including a number of views 401, a number of likes 402, a number of shares 403, a number of comments 404, and one or more comments 405. Moreover, FIG. 5 illustrates exemplary social activity history information 500 and 501 associated with the article 400 illustrated in FIG. 4. The social activity history information 500 describes a quantity of different social activity signals (e.g., views, likes, shares, comments, etc.) received by the article. Moreover, the social activity history information 501 describes the content of comments received by the article 400, such as the identity of users that posted the comments, the times when the comments were posted, the substance of the comments, contextual information about those comments (e.g., the location of the user when they posted the comment as determined by IP address of the user's device or geo-location information from the user's device, or whether the comment was received from a mobile device or desktop device, etc.). Although not illustrated in FIG. 5, the identification module 202 may access social activity history information that provides more detail with respect to other types of social activity signals, such as information describing who liked the article and when, who shared the article and when, and so on.

After the identification module 202 identifies the users that have interacted with the article (operation 302 in FIG. 3), the social attribute module 204 may access various types of profile attributes associated with these users (operation 303 in FIG. 3). For instance, in some embodiments, after the identification module 202 identifies these users, the social attribute module 204 may access member profile information for these users if they are members of an online social network service such as LinkedIn®, Facebook®, or Twitter®. For example, if the social attribute module 204 determines that the user "John Smith" has posted a comment on a particular article, then the social attribute module 204 may access the member profile page or member profile data for the user "John Smith" on the online social network service LinkedIn®. Such member profile data of the member may specify member profile attributes including, for example, name, location, job title, job experience, seniority level, employer, employer size, skills, endorsements, education, gender, age, and so on.

Figure 7:
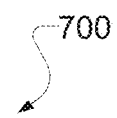
FIG. 7 illustrates an example of social attribute information associated with various content items, according to various embodiments.

Thereafter, the social attribute module 204 may associate the underlying content item with various social attribute information describing the member profile attributes of some or all the members that have interacted with the content (operation 304 in FIG. 3). The social attribute module 204 may store such social attribute information in association with the underlying content item in a data structure (e.g., a data table or record in a database), as illustrated in FIG. 7. In some embodiments, the social attribute information generated by the social attribute module 204 may specifically indicate social attributes of the types of members that have interacted to a significant degree with the content. In other words, the social attribute information may describe the types of users for which the content is trending (e.g., see FIG. 7). For example, the social attribute module 204 may perform analysis on the social attributes and/or a member profile attributes associated with each content item, in order to determine whether that article is trending among various types of users. For example, the social attribute module 204 may determine that the article is trending among users having member profile attributes A, B, and C, but not users having member profile attributes D, E, and F, where such member profile attributes may correspond to any kinds of attributes (e.g., location, employer, job title, seniority level, company size, skills, endorsements, school, and so on). For example, the social attribute module 204 may determine that a particular article is currently trending among engineers in the San Francisco Bay area who have been endorsed for the skills of "Java" and "C++", whereas this particular article is not trending among artists located in New York City that have the skills of "painting" and "interpretive dance". As a result, the social attribute module 204 may store information identifying a particular content item (e.g., a link to an article or the actual content of the article itself) in association with various social attributes describing the types of users that are consuming this content (e.g., social attributes indicating that this article is trending among lawyers that went to Michigan or engineers that work at LinkedIn®)(see FIG. 7).

According to various exemplary embodiments, the identification module 202 accesses or generate the social activity history information associated with content items (as described above in conjunction with FIG. 5) in various ways, depending on whether the underlying content item posted on an online social network service (e.g., LinkedIn) associated with the content feed selection system 200, or a $3^{rd}$ party website.

For example, according to various embodiments described above, the content items acquired or accessed by the identification module 202 may have previously been posted on an online social network service such as LinkedIn® (which may be associated with the system; see 20 and 200 in FIG. 2). Accordingly, the identification module 202 may directly access social activity history information maintained by the online social network service that describes the members of the online social network service that have interacted with this posted content. Thus, the identification module 202 may identify the members that submitted the social activity signals based on this social activity history information associated with the content item that is maintained by the online social network service.

In other embodiments, the content item may be previously posted on a website distinct from the online social network service. Thus, the identification module 202 may access these content items from external sources such as third-party websites or third-party online social network services. For example, the identification module 202 may crawl a network (e.g., the Internet) for content items such as articles, publications, news items, blog posts, responses posted on forums, billboards, question and answer services, and so on. In some embodiments, the identification module 202 may identify the content items by crawling a set known third party sources or websites that are known for hosting content items, such as websites associated with news organizations, companies, important individuals, forums, billboards, question-and-answer services, blogs and bloggers, journals, clubs, and so on. In some embodiments, the identification module 202 may also access content items from other social network services.

If the content item is hosted by a third party, then the identification module 202 may crawl the information included in the content item in order to extract the aforementioned social activity history information (see FIG. 5). For example, the identification module 302 may store a list of social activity keyword such as "view(s)", "like(s)", "share(s)", "comment(s)", and if the identification module 202 detects these words and adjacent numbers in a content item, the identification module 202 may infer that this information represents social activity history information that indicates a number of views, likes, shares, comments, etc. the content item has received. Similarly, by crawling webpages associated with content items, the identification module 202 may identify one or more comments posted in response to the content item (e.g., such comments are typically displayed at a lower portion of the content item below the words "comments"). Accordingly, the identification module 202 may generate social activity history information (e.g. see FIG. 5) describing social activity signals associated with a particular content item hosted a third party website. The identification module 202 may store such social activity history information in a database. Accordingly, the identification module 202 may identify the members that submitted the social activity signals to this content item by crawling the content item for social activity history information that describes social activity signals submitted by users in connection with the content item, and identifying members of the social network service having names that match the users.

In some embodiments, when the identification module 202 accesses the content item from a third-party website, the system may transmit a request to the third party website for interaction information describing users that have interacted with or submitted social activity signals in conjunction with various content items. For example, if the content feed selection system 200 is associated with the online social network service LinkedIn®, and the identification module 202 accesses and article posted on the webpage of the New York Times, the system may transmit a request to the New York Times website (e.g., via one or more application programming interfaces (APIs) associated with the New York Times website) for information describing the names of members that have liked the article, viewed the article, shared the article, e-mailed the article, and so on. Thereafter, the identification module 202 may look for the names of these users among the member base of the online social network service itself, and may then access the member profile attributes of these members and associate these attributes with the New York Times article, consistent with various embodiments described above.

In some embodiments, after the identification module 202 identifies the users that have interacted with the content item, the social attribute module 204 may access attributes of these users from other third-party sources, as opposed to their member profile attributes on an online social network service such as LinkedIn®. For example, the social attribute module 204 may perform a network search of the Internet based on usernames, and may crawl the results in order to identify profile pages, biography pages, articles, etc., that are associated with these names. Thus, the social attribute module 204 may identify that, for example, the user having the name "John Smith" likely corresponds to a user "John Smith" described in a lawyer biography page of a law firm website.

Thus, the social attribute module 204 may crawl various profile attributes from the lawyer profile page, such as name, location, contact information, seniority level, job title, experience, areas of specialty, skills, endorsements, awards, publications, and so on. As another example, the social attribute module 204 may identify that the user is and inventor on a patent posted on a webpage of the United States Patent and Trademark Office, and thus the social attribute module 204 may infer that the user has experience in one or more fields associated with information described in the patent. In some embodiments, the social attribute module 204 may identify articles, publications, presentations, etc. authored by the user, and may thus infer that the user has experience, skills, or endorsements associated with content, areas, fields, or topics described in the underlying articles, publications, etc. Accordingly various exemplary embodiments, the social attribute module 204 may infer that the user has skills in the topic X, if the content they authored describes information related to topic X. In some embodiments, if the content authored by the user is a publication, article, slideshow, etc. that has received a statistically significant number of comments having positive sentiment, or a statistically significant number of social activity signals such as likes, shares, follows, and so on, then the social attribute module 204 may treat classify this user as being endorsed for skills in the relevant topic of the content authored by the user. According to various exemplary embodiments, if the user has authored an article or publication that has been cited by other articles or publications, then the social attribute module 204 may classify this user as being endorsed for skills in the relevant topic of the article or publication authored by the user.

Figure 6:
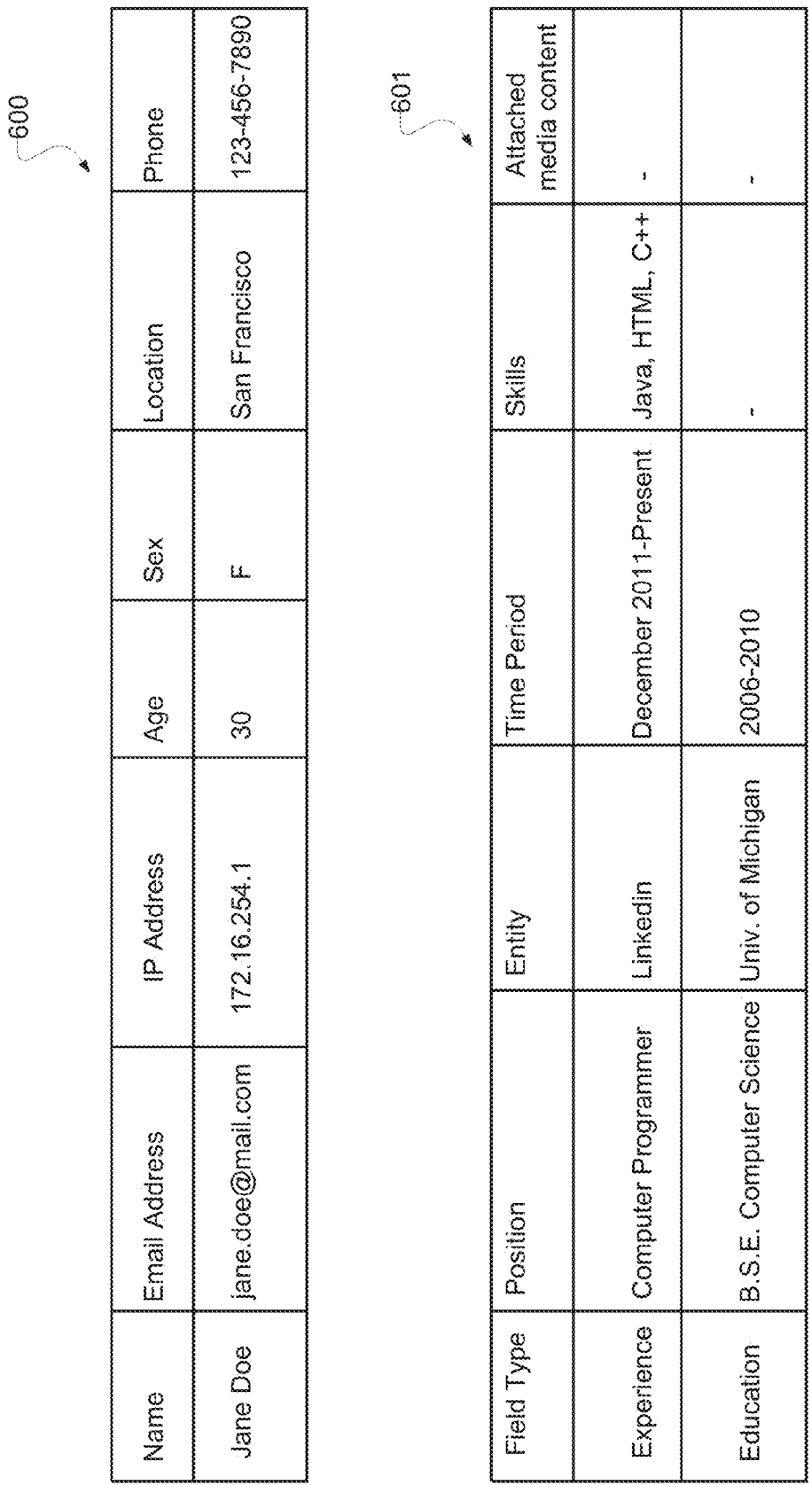
FIG. 6 illustrates an example of member profile data associated with a particular member of a social network service, according to various embodiments.

According to various exemplary embodiments, the identification module 204 may identify whether content items are trending among particular kinds of users by analyzing the social activity history information associated with content items, where the social activity history information may indicate users that publicly submitted various social activity signals. For example, if the article 400 in FIG. 4 is posted on a social network service such as LinkedIn®, then each of the social activity signals will be received from other existing members of the social network service, such as John Smith, Jane Doe, etc, as identified in the comments, likes, shares, etc. Accordingly, after accessing social activity history information associated with a content item, the social attribute module 204 may access information associated with each of the members of the social network service that publicly submitted these social activity signals, in order to determine the member profile attributes of these members. For example, since one of the comments to the article 400 was received from the user Jane Doe, the social attribute module 204 may access member profile data associated with a member profile of the user Jane Doe. For example, FIG. 6 illustrates an example of member profile data 600 and 601 associated with a user Jane Doe that is maintained by social network service such as LinkedIn®, where the member profile data 600 and 601 includes information such as name, age, gender, location, contact information (e.g., phone number, e-mail address, screen name, etc.), information regarding experience and educational positions of the member (e.g., job position/title, employer, term of employment, degree, educational institutions, skills, etc.), and so on. The member profile data 600 illustrated in FIG. 6 is merely exemplary, and the member profile data may include other information such as groups followed, educational institutions followed, companies followed, influencers followed, and social activity signals associated with the member (e.g., content items viewed, liked, shared, commented on, substance of comments, etc.), and so on.

Accordingly, based on the member profile data of the members that have generated social activity signals associated with the article 400, the social attribute module 204 may identify what type of people have viewed the article, liked the article, shared the article, commented on the article, and so on. Based on this information, the identification module 202 may determine that the article is trending, popular, or viral with specific types of users (e.g., user sharing specific member profile attributes). For example, the social attribute module 204 may determine that the article 400 has at least a predetermined number or proportion of views, likes, shares, clicks, comments, and/or other social activity signals from users that went to school at Michigan or worked at LinkedIn®, or that the article 400 has received at least a predetermined number or proportion of social activity signals during a predetermined time interval (e.g., the last hour, the last eight hours, the last 24 hours, the last two days, etc.) from users that went to school at Michigan or worked at LinkedIn®, and so on. In some embodiments, the social attribute module 204 may determine that a content item hosted by the third party website is trending by accessing the content item periodically (e.g., at regular time intervals), in order to track the increase in social activity signals (e.g., views, shares, likes, etc.) received by the content item within a time interval (e.g., the last hour, the last eight hours, the last 24 hours, the last two days, etc.).

Figure 8:
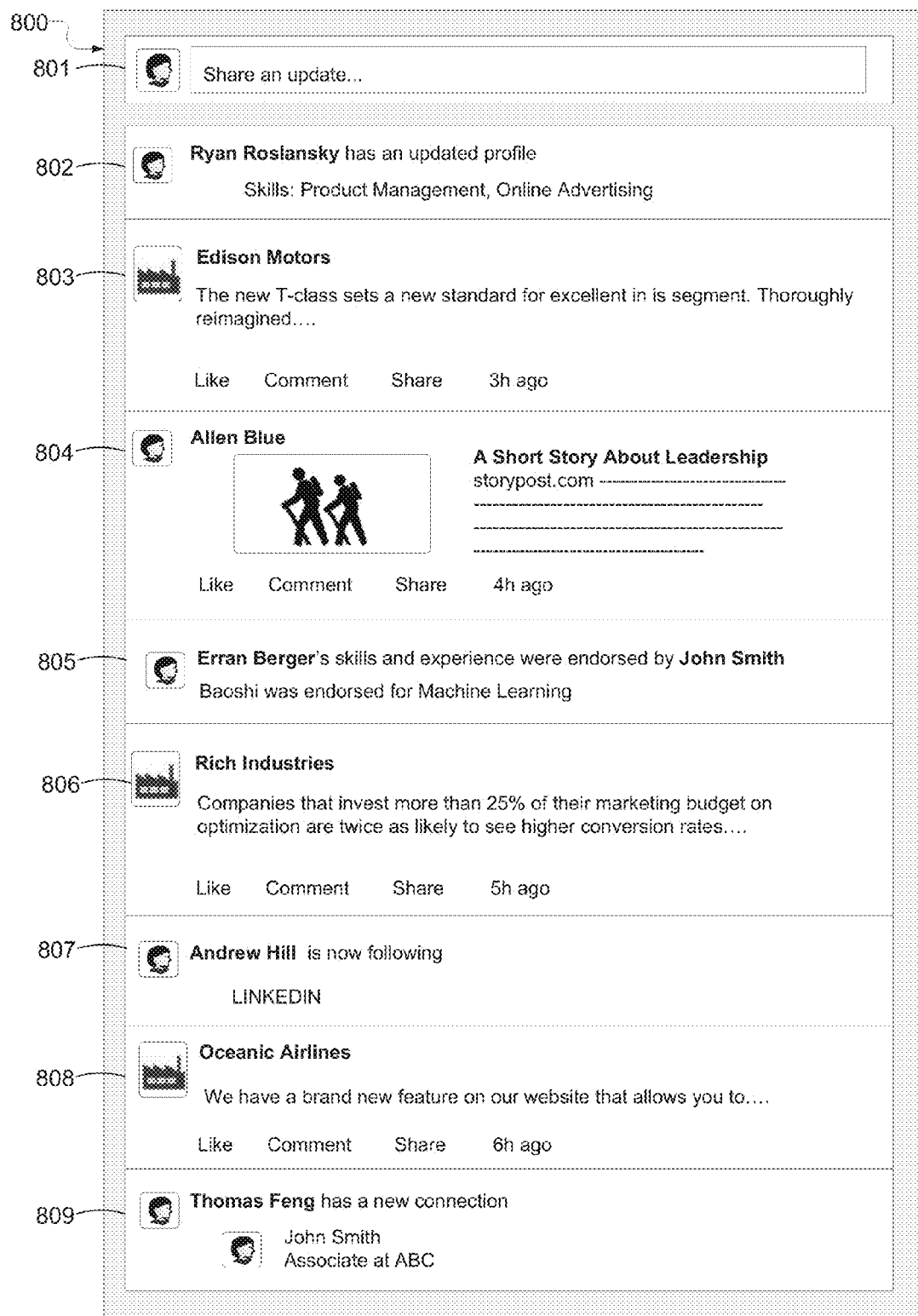
FIG. 8 illustrates an example of a content feed of a social network service, according to various embodiments.
Figure 10:
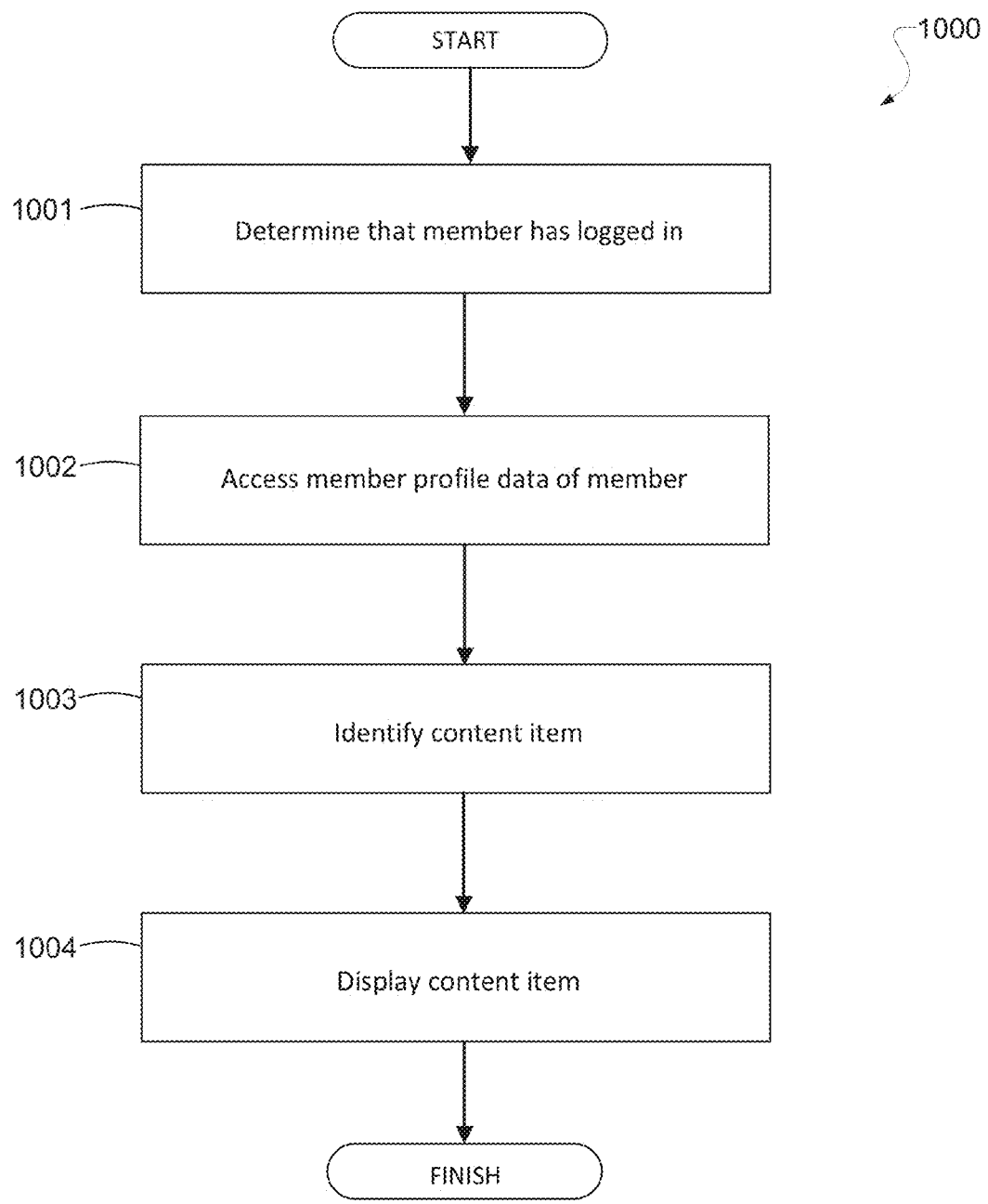
FIG. 10 is a flowchart illustrating an example method, according to various embodiments.

Turning now to FIGS. 8-10, in accordance with various exemplary embodiments, when the content feed selection module 206 of the content feed selection system 200 determines that a user has logged in into a website (e.g., a website of the social network service LinkedIn®) and is viewing a content feed (e.g., a content feed associated with an online social network service such as LinkedIn® or Facebook®), the content feed selection module 206 may analyze various member profile attributes of this logged-in user, such as the logged-in user's location, job, seniority level, company size, skills, endorsements, education, etc. If the logged-in user is a member of the online social network service, the content feed selection module 206 may access member profile data and/or a member profile page associated with this logged-in user in order to identify the appropriate attributes of this logged-in user. Thereafter, the content feed selection module 206 may access social attribute information describing various content items associated with various social attributes (consistent with various embodiments described above), and the content feed selection module 206 may identify content items previously crawled from the Internet that are associated with the social attributes matching the member profile attributes of the visiting member. For example, if the logged-in user is a lawyer that went to Michigan University that lives in the Bay Area, and that has been endorsed for the skills of "criminal law" and "trial law", then the content feed selection module 206 may identify content items that are trending among users with similar social attributes (e.g., content articles trending among users that are lawyers, that attended Michigan, and/or that are endorsed for the skills of "criminal law" and "trial lawyer".

Once the content feed selection module 206 identifies content items ascribed to social attributes matching the member profile attributes of the logged-in member, the content feed selection module 206 may adjust content in a content feed viewable by the logged-in member accordingly. For example, referring to the previous example described above, the content feed selection module 206 will display more content that was viewed by lawyers that attended Michigan that have the endorsements for "criminal law" and "trial law", and so on. In some embodiments, the content feed selection module 206 may instead or in addition hide content items not associated with social attributes matching the member profile attributes of the visiting member. In other words, the content feed selection module 206 will not display content items that are not trending among lawyers that attended Michigan and that have the endorsements of "criminal law" and "trial law".

In some embodiments, when the content feed selection module 206 adjusts the display of content items in a content feed viewable by the logged-in user, the content feed selection module 206 may include a note or label identifying why a particular content item is being included in the content feed. For example, the system may display an article together with the caption that "this article is currently trending among lawyers who attended Michigan and who have been endorsed for the skills of "criminal law" and "trial law". Thus, the note may indicate the various social attributes that have been ascribed to this content item, and/or may indicate that the specific content item has been disseminated by (or is trending among) members that are similar to the logged in member because they possess such attributes.

For example, FIG. 8 illustrates an exemplary content feed 800 of a social network service (e.g., LinkedIn®) that is displayed to a member of the social network service when they login to the social network service. The content feed 800 includes status updates and news associated with other members of the social network service that are connected to the particular member. For example, the content feed 800 includes a status update 802 indicating that a connection has an updated profile, a status update 804 indicating that a connection has shared an article, a status update 805 indicating that the skills of a connection were endorsed by others, a status update 807 indicating that a connection has begun following a company, a status update 809 indicating that a connection has new connections, and so on. The content feed 800 also includes a user interface element 801 allowing the particular member to enter status updates, and to share these status updates with other members of the social network service (e.g., where the status updates are placed into the content feeds of other members connected to the particular member). A social network service such as LinkedIn® also allows a member to access content associated with various interests by following a particular company, an organization, an educational institution (e.g., school or university), a particular influencer (e.g., a very important or influential member of the social network service), a particular group, and so on. For example, when a member follows a company, an educational institution, an influencer, a group, and so on, information regarding each of these interests will be included in the content feed displayed to the member. For example, suppose the member viewing the content feed 800 in FIG. 8 is following the companies "Edison Motors", "Rich Industries", and "Oceanic Airlines". Accordingly, the content feed 800 includes various information (e.g., posts, shares, news, status updates, etc.) that relate to these companies, such as posts 803, 806, and 808 in the content feed 800. The content feed 800 illustrated in FIG. 8 is merely exemplary and may correspond to the main content feed displayed on the homepage of a social network service such as LinkedIn®. However, social network services such as LinkedIn® may include other content feeds, such as company content feeds associated with companies, group content feeds associated with groups, education content feeds associated with educational institutions, influencer feeds associated with influencers, member content feeds associated with members, and so on. In some embodiments, the content feed selection module 206 may insert the specific content item itself into a content stream of the online social network service. For example, FIG. 9 illustrates a content feed 900 similar to the content feed 800 illustrated in FIG. 8, where and update 901 associated with the article 500 has been inserted into the content feed 900. More specifically, the update 901 refers to the article 500 and includes a reference link for accessing the article 500. The update 901 also includes a note indicating that "this comment is trending among computer scientists!".

FIG. 10 is a flowchart illustrating an example method 1000, consistent with various embodiments described above. The method 1000 may be performed at least in part by, for example, the content feed selection system 200 illustrated in FIG. 2 (or an apparatus having similar modules, such as client machines 110 and 112 or application server 118 illustrated in FIG. 1). In operation 1001, the content feed selection module 206 determines that a particular member of the online social network service has logged into the online social network service. In operation 1002, the content feed selection module 206 accesses member profile data describing a particular member profile attribute associated with the particular member. In operation 1003, the content feed selection module 206 identifies, based on the social attribute information, a specific one of the content items that has received social activity signals from additional members having a member profile attribute matching the particular member profile attribute of the particular member. In operation 1004, the content feed selection module 206 displays the specific content item in a content feed of the online social network service to the particular member such that the content feed is viewable by the particular member.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 11:
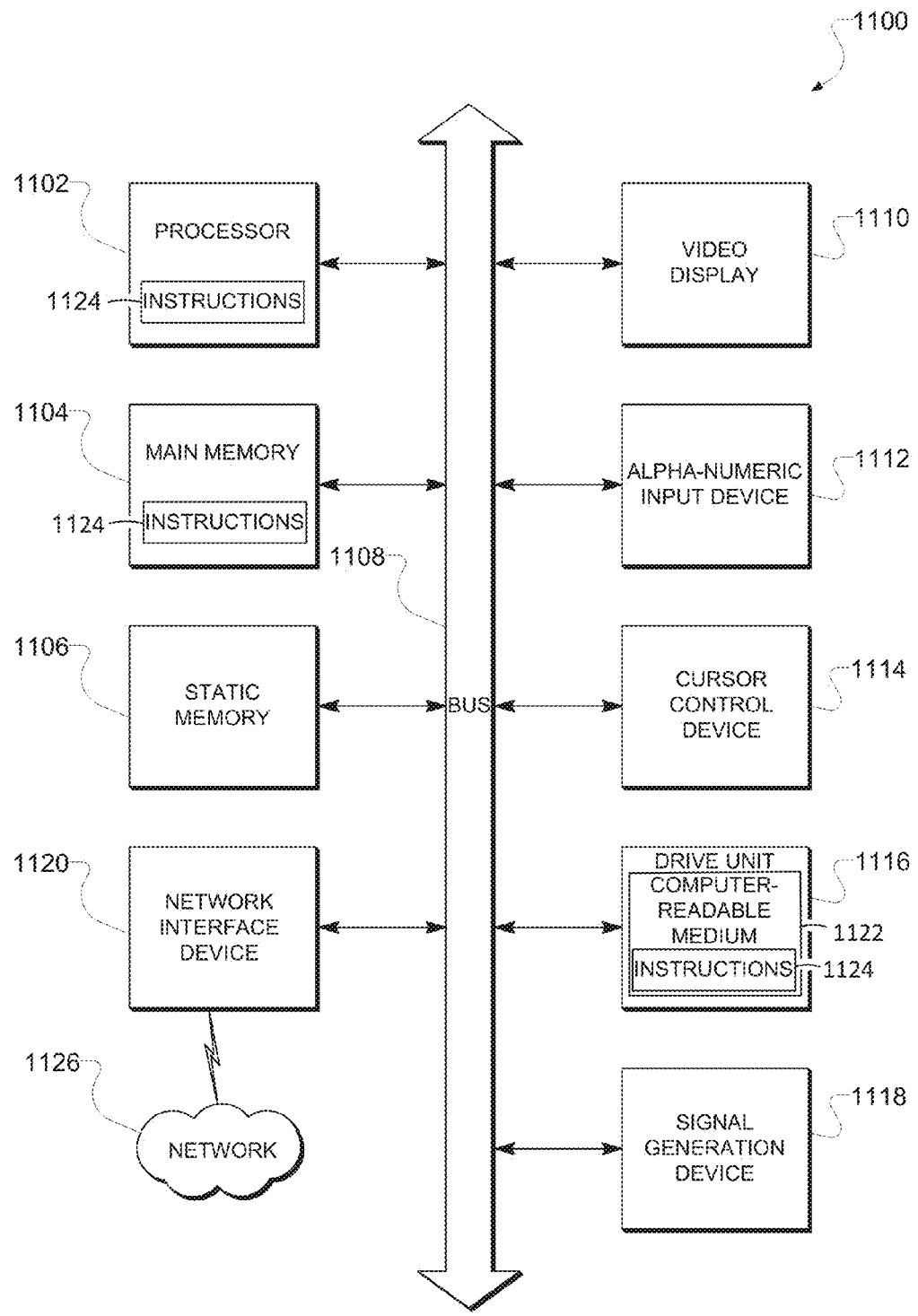
FIG. 11 is a diagrammatic representation of a machine in the example form of a computer system within which a set of instructions, for causing the machine to perform any one or more of the methodologies discussed herein, may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard or a touch-sensitive display screen), a user interface (UI) navigation device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi, LTE, and WiMAX networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:
  accessing one or more content items accessible via a network, each of the content items having received one or more social activity signals;
  identifying members of an online social network service that submitted the social activity signals;
  accessing, by a machine including a memory and at least one processor, member profile data identifying one or more member profile attributes of each of the members, the member profile attributes including endorsements of one or more skills received from other members of the online social network service;
  generating social attribute information associated with each of the content items, the social attribute information identifying the member profile attributes including endorsements of one or more skills of each of the members that submitted the social activity signals associated with each of the content items;
  storing the social attribute information associated with each of the content items in a database in association with each of the content items;
  determining that a particular member of the online social network service has logged into the online social network service;
  accessing member profile data describing a particular member profile attribute associated with the particular member, the particular member profile attribute corresponding to endorsements of one or more skills of the particular member received from other members of the online social network service;
  identifying, based on the social attribute information, a specific one of the content items that has received social activity signals from additional members having a member profile attribute matching the particular member profile attribute of the particular member;
  displaying the specific content item in a content feed of the online social network service, the content feed being viewable by the particular member; and
  displaying a comment in the content feed indicating that the specific content item has been disseminated by the additional members having the member profile attribute matching the particular member profile attribute of the particular member.

2. The method of claim 1, wherein the content item is at least one of a news item, a publication, an article, a blog post, and an advertisement.

3. The method of claim 1, wherein the social activity signals include views, likes, comments, shares, follows, clicks, conversions, or hover responses.

4. The method of claim 1, wherein at least one of the content items was previously posted on the online social network service, and
wherein the identifying comprises accessing social activity history information associated with the content item that is maintained by the online social network service, the social activity history information describing social activity signals submitted by members of the online social network service in connection with the content item.

5. The method of claim 1, wherein at least one of the content items was previously posted on a website distinct from the online social network service, and
wherein the identifying comprises:
crawling the content item for social activity history information that describes social activity signals submitted by users in connection with the content item; and
identifying members of the social network service having names that match the users.

6. The method of claim 1, wherein the member profile attributes further include at least one of a seniority level and a company size associated with each of the members.

7. The method of claim 1, wherein the comment specifies the member profile attribute of the additional members that matches the particular member profile attribute of the particular member.

8. A system comprising:
a machine including a memory and at least one processor;
an identification module, executable by the machine, configured to:
access one or more content items accessible via a network, each of the content items having received one or more social activity signals; and
identify members of an online social network service that submitted the social activity signals;
a social attribute module configured to:
access, by a machine including a memory and at least one processor, member profile data identifying one or more member profile attributes of each of the members, the member profile attributes including endorsements of one or more skills received from other members of the online social network service;
generate social attribute information associated with each of the content items, the social attribute information identifying the member profile attributes including endorsements of one or more skills of each of the members that submitted the social activity signals associated with each of the content items; and
store the social attribute information associated with each of the content items in a database in association with each of the content items; and
a content feed selection module configured to:
determine that a particular member of the online social network service has logged into the online social network service;
access member profile data describing a particular member profile attribute associated with the particular member, the particular member profile attribute corresponding to endorsements of one or more skills of the particular member received from other members of the online social network service;
identify, based on the social attribute information, a specific one of the content items that has received social activity signals from members having a member profile attribute matching the particular member profile attribute of the particular member;
display the specific content item in a content feed of the online social network service, the content feed being viewable by the particular member; and
display a comment in the content feed indicating that the specific content item has been disseminated by the members having the member profile attribute matching the particular member profile attribute of the particular member.

9. The system of claim 8, wherein the content item is at least one of a news item, a publication, an article, a blog post, and an advertisement.

10. The system of claim 8, wherein the social activity signals include views, likes, comments, shares, follows, clicks, conversions, or hover responses.

11. The system of claim 8, wherein at least one of the content items was previously posted on the online social network service, and
wherein the identifying comprises:
accessing social activity history information associated with the content item that is maintained by the online social network service, the social activity history information describing social activity signals submitted by members of the online social network service in connection with the content item.

12. The system of claim 8, wherein at least one of the content items was previously posted on a website distinct from the online social network service, and
wherein the identifying comprises:
crawling the content item for social activity history information that describes social activity signals submitted by users in connection with the content item; and
identifying members of the social network service having names that match the users.

13. A non-transitory machine-readable storage medium comprising instructions that, when executed by one or more processors of a machine, cause the machine to perform operations comprising:
accessing one or more content items accessible via a network, each of the content items having received one or more social activity signals;
identifying members of an online social network service that submitted the social activity signals;
accessing, by a machine including a memory and at least one processor, member profile data identifying one or more member profile attributes of each of the members, the member profile attributes including endorsements of one or more skills received from other members of the online social network service;
generating social attribute information associated with each of the content items, the social attribute information identifying the member profile attributes including endorsements of one or more skills of each of the members that submitted the social activity signals associated with each of the content items;
storing the social attribute information associated with each of the content items in a database in association with each of the content items;

determining that a particular member of the online social network service has logged into the online social network service;

accessing member profile data describing a particular member profile attribute associated with the particular member, the particular member profile attribute corresponding to endorsements of one or more skills of the particular member received from other members of the online social network service;

identifying, based on the social attribute information, a specific one of the content items that has received social activity signals from additional members having a member profile attribute matching the particular member profile attribute of the particular member;

displaying the specific content item in a content feed of the online social network service, the content feed being viewable by the particular member; and displaying a comment in the content feed indicating that the specific content item has been disseminated by the additional members having the member profile attribute matching the particular member profile attribute of the particular member.

\* \* \* \* \*